United States Patent [19]

Montgomery

[11] Patent Number: 4,992,790
[45] Date of Patent: Feb. 12, 1991

[54] DIGITAL PHASE-LOCKED LOOP BIPHASE DEMODULATING METHOD AND APPARATUS

[75] Inventor: Michael A. Montgomery, Cedar Park, Tex.

[73] Assignee: Schlumberger Technology Corporation, Houston, Tex.

[21] Appl. No.: 409,618

[22] Filed: Sep. 19, 1989

[51] Int. Cl.[5] .............................................. H03M 7/12
[52] U.S. Cl. .......................................... 341/70; 345/87
[58] Field of Search ....................... 341/53, 70; 375/87

[56] References Cited

U.S. PATENT DOCUMENTS

| | | |
|---|---|---|
| 3,836,956 | 9/1974 | Cross . |
| 4,080,572 | 3/1978 | Hastings et al. . |
| 4,092,491 | 5/1978 | Frazer . |
| 4,146,743 | 3/1979 | Raynham . |
| 4,146,841 | 3/1979 | McRae . |
| 4,167,760 | 9/1979 | Decker . |
| 4,223,326 | 9/1980 | D'Amato et al. . |
| 4,242,755 | 12/1980 | Gauzan . |
| 4,313,206 | 1/1982 | Woodward . |
| 4,320,525 | 3/1982 | Woodward . |
| 4,361,895 | 11/1982 | Khoudari . |
| 4,513,427 | 4/1985 | Borriello et al. . |
| 4,562,582 | 12/1983 | Tokura et al. . |
| 4,592,072 | 5/1986 | Stewart . |
| 4,603,322 | 7/1986 | Blair . |
| 4,868,569 | 9/1989 | Montgomery ................ 341/70 |
| 4,881,059 | 11/1989 | Saltzberg ..................... 341/70 |
| 4,884,074 | 11/1989 | Nourry et al. ................ 341/70 |

Primary Examiner—William M. Shoop, Jr.
Assistant Examiner—Helen Kim
Attorney, Agent, or Firm—Cox & Smith

[57] ABSTRACT

A method and apparatus for demodulating biphase-encoded signals is disclosed. A digital phase-locked loop produces a clock signal which is in phase with the clock signal of the biphase-encoded input signal. The clock signal from the phase-locked loop is then used to derive the data signal from the biphase-encoded input signal in a manner which enhances tolerance to edge skewing.

12 Claims, 6 Drawing Sheets

DIGITAL PHASE-LOCKED LOOP BIPHASE DEMODULATING METHOD AND APPARATUS

BACKGROUND OF INVENTION

1. Field of Invention

The present invention relates to systems and methods for decoding baseband-encoded digital data.

2. Background

In many applications, it is desirable to reliably transmit digital data encoded in such a manner that the clock signal and data signal are contained within one signal. That permits remote transmission in situations where the receiver is not synchronized to the transmitter, and where transmitting an additional signal containing just the clock signal is not feasible due to skew or channel constraints. There are, of course, several possible encoding schemes for combining the clock and data signal. The two most frequently used baseband methods are biphase encoding and Manchester encoding. Those two encoding schemes and others can be derived from one another, such that most of the encoding and decoding methods that are applicable to any of those baseband schemes may be applied with some small transformation to the other baseband encoding schemes.

Those, encoding schemes involve frequency modulating a pulse train in accordance with a data signal. In biphase coding, the pulse train carrier is generated such that each transition represents the start of a new clock cycle. The carrier is further modulated by adding an extra transition in the middle of the clock cycle if the corresponding data signal is a one. The lack of a mid-cycle or mid-bit transition represents a data signal of zero. In biphase code, the directions of the transitions are ignored in the decoding process.

Circuitry for decoding combined data and clock signals for those schemes have been designed. However, the complexity of the circuits necessary for decoding encoded signals is dependent upon the degree of noise immunity desired. Whenever a signal is transmitted, it is affected by energy present in the environment, referred to as noise, which tends to distort the signal. That distortion typically manifests itself by skewing the edges of the signal. In order to recover the original data that was transmitted, it is necessary to examine the received signal to determine which transmitted value could be distorted with the smallest amount of noise to result in the signal received. That is, a decision must be made as to which transmitted value is most probable. The effectiveness with which that decision is made determines the noise immunity of a particular circuit.

There are two primary methods for accomplishing the decoding: analog and digital. The analog methods use analog circuitry such as an analog phase-locked loop to recover the clock information present in the transmitted signal. That recovered clock information is then used to determine the data values in the signal. The digital methods generally use an external decoder clock operating at a frequency that is approximately equal to a multiple of the transmitted clock frequency. That clock is used to sample the transmitted signal at various points. Those samples are then used to determine the clock value and data value embedded in the combined signal by detecting transitions within the signal. Since the approximate frequency of the transmitted clock signal is known, a transition followed by another transition one transmitted clock period later can be decoded as a zero data signal and one transmitted clock cycle. The second transition is then regarded as the start of another bit cycle. If the next transition occurs at the end of the bit cycle, another zero is decoded. On the other hand, if the next transition occurs in the middle of the bit cycle, a one is decoded with the following transition marking the start of a new bit cycle. Because of both sampling error and skewing of the signal edges, however, transitions may not occur or be detected at precisely the times indicated above. In such cases, the transition is decoded as that transmitted value which is the most probable to have been transmitted. For example, a transition occurring before ¾-bit time is read as a one, while a transition occurring after ¾-time is read as a zero and the start of another bit cycle. It is ambiguous, however, whether a transition occurring within a sample containing the ¾-bit time should be decoded as a one or a zero.

For digital decoding, a clock operating at some multiple of the transmitted clock frequency is used to take some number of samples per bit cycle of the input signal. As the number of samples per bit is increased, the amount of data available for making the decoding decision is increased such that it is possible to gain greater noise immunity. The cost for doing so, however, is that a clock operating at a higher frequency must be built, and the decoding circuit must be able to operate at a correspondingly faster speed. Operation at higher speeds typically requires more expensive and carefully designed circuitry. In some cases, commercially available components cannot be found to operate at such speeds.

Systems and methods for decoding baseband-encoded digital signals have been developed to provide for more reliable decoding in the presence of noise. One such system is disclosed in U.S. patent application Ser. No. 07/244,642, filed on Sept. 12, 1988, and assigned to Schlumberger Well Services, which is hereby incorporated by reference into the present application. In the system described in that application, a "look ahead" scheme is used to defer decoding decisions for transitions occurring within samples containing the ¾-bit time until ½-bit time later. That system, however, measures the bit time used to make decoding decisions from detected bit-boundary transitions. Skewing of those bit-boundary transitions can, therefore, result in performance degradation since the bit times will then not be measured correctly.

SUMMARY OF THE INVENTION

In accordance with the present invention, samples of the biphase input signal are taken at a rate equal to some multiple of the frequency of the transmitted clock signal or carrier. The input samples are serially stored in a shift register as binary ones or zeroes in accordance with whether a transition occurred or not, respectively, within the sample. A digital phase-locked loop (PLL) is used to generate a clock signal with a known and constant phase relationship to the carrier signal. At a fixed point during every cycle of the generated PLL clock, the shift register is tested to ascertain whether a transition of the input signal corresponding to a bit boundary (i.e., the start or end of a transmitted clock cycle) has occurred at a specified time in relation to the PLL clock. The phase of the PLL clock signal is then adjusted by advancing or retarding a counter used to generate the PLL clock according to whether the bit-boundary transition occurred earlier or later, respectively, than the specified time. In this way, a known and constant phase relationship between the PLL clock and the carrier frequency is maintained.

The data signal encoded into the biphase input signal is recovered by testing the sample shift register at a specified time during each cycle of the PLL clock to ascertain whether a mid-bit transition occurred or not. This decoding decision is made by determining the location of transitions stored within the sample shift register. Since the decoding decision is made with respect to a series of stored samples, the ambiguity corresponding to a transition occurring at a time close to the ¾-bit time can be resolved by "looking ahead" to see whether another transition occurred before the 5/4-bit time, in which case, the earlier transition is deemed to be a mid-bit transition.

It is an object of the present invention to provide a method and apparatus for digitally demodulating biphase-encoded signals with enhanced tolerance to skewing of signal transitions and particularly to skewing of bitboundary transitions. Other objects, features and advantages of the invention will become evident in light of the following detailed description considered in conjunction with the referenced drawing of a preferred exemplary embodiment according to the present invention.

DESCRIPTION OF THE INVENTION

The method of the present invention will be described in detail and reference to a particular hardware implementation. Many alternative implementations, of course, would be apparent to those of ordinary skill in the art who have the benefit of this disclosure (e.g., an appropriately programmed computer). In order to facilitate the description, the implementation will be described as an apparatus for decoding a biphase-encoded input signal wherein a mid-bit transition represents a data value of one. With only minor modifications, the described apparatus could be used for other baseband encoding schemes.

In the description that follows, particular hardware components will be referred to with a numeric or alpha-numeric designation. Signal signatures, on the other hand, will be represented by a purely alphabetic designation or with an alphabetic designation along with a number in parentheses. An asterisk, "*", appended to a signal signature represents the inverted value of the signal. In the Boolean equations given to describe some of the signals, a "+" indicates an OR function while an "&" indicates an AND function.

Figure 1:
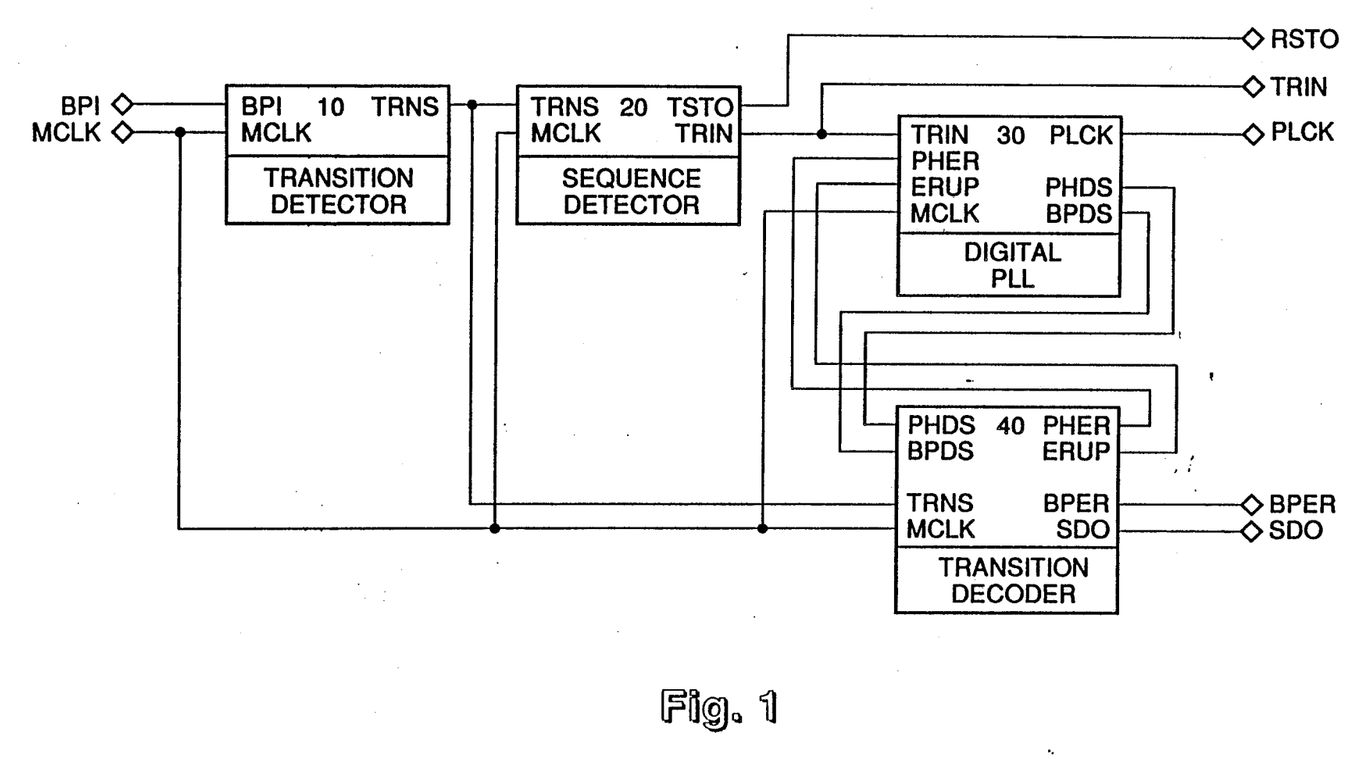
FIG. 1 is a block diagram of a particular implementation of the present invention.

FIG. 1 is a block diagram of the biphase demodulator to be described comprising an edge detector 10, a sequence detector 20, a digital phase-locked loop 30, and a transition decoder 40. Serial samples of the biphase input signal BPI are clocked into the edge detector 10 by successive transitions of MCLK. MCLK is the master clock signal to drive the entire system and is chosen to be a frequency which is some multiple of the carrier or transmitted clock signal. In this particular implementation, the frequency of MCLK is chosen to be sixteen times greater than the carrier frequency. Therefore, sixteen samples per bit cycle of the input BPI are successively clocked into the edge detector 10. The signal TRNS is output from the edge detector 10 during each MCLK cycle which corresponds to a particular sample of BPI. TRNS is high if a transition occurred during the corresponding sample of BPI and low otherwise. Successive values of TRNS are stored in a shift register in this particular implementation. In other implementations, another type of storage device allowing storage of signals with respect to time may be used (e.g., a FIFO queue in a software implementation).

The digital PLL 30 uses a counter driven by MCLK to generate a clock signal PLCK of the same frequency as the transmitted clock. The values of TRNS stored within the shift register are periodically checked by the transition decoder 40 to ascertain the phase difference between the carrier signal (which is modulated to produce BPI) and PLCK. This occurs at a specified time within the PLCK cycle marked by the assertion of the phase decision signal for one MCLK cycle. Within the transition decoder 40 is a phase-error detector which determines whether the specified phase relationship between PLCK and the carrier exists by ascertaining when a transition of BPI corresponding to a bit-boundary transition occurred. That is done by testing which values of TRNS stored within the shift register are logical ones (i.e., represent sampled transitions). If the correct phase relationship does not exist, the phase-error signal PHER is asserted. Logic within the decoder 40 further determines whether the phase difference is positive or negative which is signified by the assertion or not, respectively, of the phase difference direction signal ERUP. While PHDS is asserted, the counter used to generate PLCK can be either advanced or retarded in accordance with ERUP if PHER is also asserted to move PLCK toward the correct phase relationship with the input carrier.

At another predetermined time within the PLCK cycle marked by the assertion of the biphase decision signal BPDS, the presence or not of a mid-bit transition within a bit cycle of BPI is detected by testing the values of TRNS stored within the shift register. The demodulated data signal SDO thus derived is then output from the decoder. A transition occurring more that 1/16 of a bit cycle before the ¾-bit time is deemed a bit-boundary transition. A transition occurring within 1/16 of a bit of the ¾-bit time is deemed a mid-bit transition if another transition occurs before the 5/4-bit time and a bit-boundary transition otherwise. If no transition occurs within 1/16 of the ¾-bit time and no transition occurs between the ¾-bit time and the 5/4-bit time, an invalid biphase input is detected which is signified by the assertion of the biphase error signal BPER.

The decoding of biphase encoded data and the phase adjustments to the PLCK signal used to accomplish the former are both performed concurrently. In order for apparent phase errors in PLCK due to skewing of bit-boundary transitions of BPI not to affect the decoding of data, phase adjustments to PLCK when biphase data is being decoded are only made after a specified number of phase errors in a net positive or negative direction are counted. It is advantageous, however, to provide a means for bringing PLCK more quickly into the correct phase before the actual biphase-encoded signal is received. That can be accomplished with a special input signal of the same phase as the carrier, referred to as a training sequence, which the PLL can recognize and lock onto more quickly. In the particular embodiment described herein, the training sequence is an input signal with a frequency four times that of the carrier, i.e., with pulses thirty-two samples wide. When such a training sequence is input, any phase error detected during the assertion of PHDS causes a 1/16 of a bit phase adjustment to PLCK. When no bit-boundary transitions are detected during the assertion of PHDS, no phase adjustments are made. Therefore, during the training sequence phase adjustments of 1/16 of a bit can be made once every two PLCK cycles to bring PLCK quickly into the correct phase. The training sequence is recognized by the sequence detector 20 and signified by the assertion of TRIN. A reset sequence comprising an input signal with even longer pulses may also be recognized and signified by the assertion of RSTO which remains asserted until a training sequence is detected.

The components which make up the system just described will now be described in greater detail. FIGS. 2, 3, 4 and 5a through 5h are schematics of a particular hardware implementation.

Figure 2:
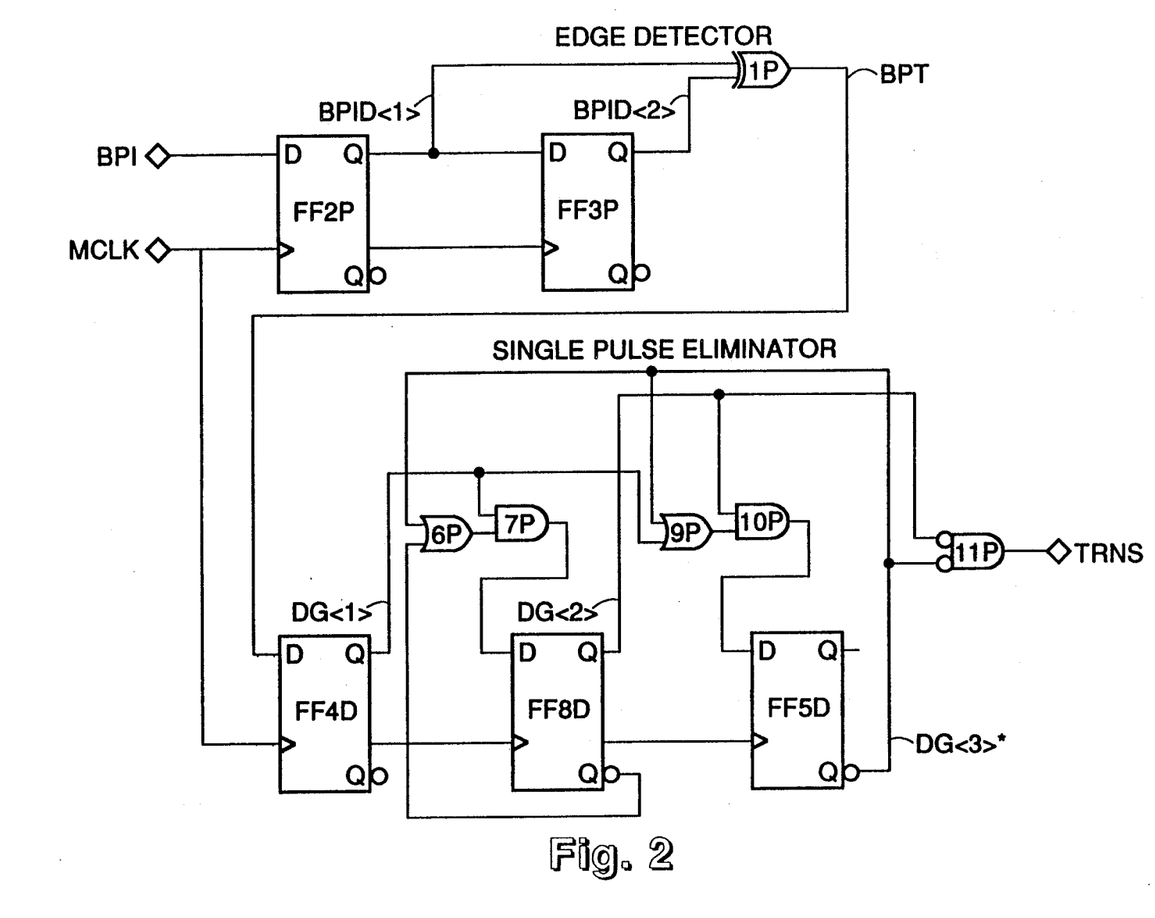
FIG. 2 shows the transition-detector components.

Referring first to FIG. 2, the two primary inputs to the apparatus are MCLK and BPI. As aforesaid, MCLK is the master clock signal originating from an oscillator (not shown) and chosen to be a frequency 16 times the transmitted clock frequency. Unless otherwise specified, the rising edge of MCLK is used to clock data into all of the D-type flip-flops to be described below. BPI is the biphase input signal which is to be decoded by the apparatus. Samples of BPI are first clocked into flip-flop FF2P on successive rising edges of MCLK. Because MCLK is sixteen times the transmitted clock frequency, the apparatus takes sixteen samples of BPI per bit cycle.

Flip-flops FF2P and FF3P and EXCLUSIVE-OR gate 1P make up the edge detector portion of the circuitry. As each sample of BPI is clocked into FF2P, the sample taken on the previous clock cycle is shifted into FF3P. The output of FF2P, BPID(1), and the output of FF3P, BPID(2), are compared by EXCLUSIVE-OR gate 1P. If the two outputs are different, an edge, or transition, is detected and a one is shifted into flip-flop FF4P on the next clock cycle. If no transition is detected, a zero is clocked into FF4P.

Flip-flops FF4P, FF8P and FF5P make up a digital filter which serves to eliminate transitions occurring on successive clock cycles due to noise. In the description that follows, the outputs of FF4P, FF8P and FF5P are referred to as DG(1), DG(2) and DG(3), respectively. The operation of the filter is as follows:

1. If the input DG(1) has a 1 value preceded and followed by 0 values, it passes through undisturbed.
2. If the input DG(1) has a 0 value, 1 value, 1 value and, finally, a 0 value, the 1 values are discarded and the output is all zeroes.
3. If the input DG(1) has a 0 value, 3 or more subsequent clocks in which the input has a 1 value and, finally, a 0 value, these successive 1 values are replaced by a series of 0 values with a 1 value in the center.

Case 2 eliminates transitions due to noise affecting a single sample, and case 3 eliminates spurious transitions due to noise about the 0 crossing of the input signal when it is digitized.

This is implemented using a two-stage filter consisting of flip-flops FF8P and FF5P. The first stage is implemented using an equivalent OR-AND function made up of OR gate 6P and AND gate 7P. The OR function has inputs from DG(2) inverted and DG(3) inverted to determine if any pulse is already in the three-stage filter. The signal from the OR function goes to the AND function along with the output of DG(1) which enables an input pulse to pass to FF8P only if no pulse is in the filter and a new pulse arrives. The second stage is implemented using an equivalent OR-AND function made up of OR gate 9P and AND gate 10P. The inputs to an OR gate 9P is DG(1) and DG(3) inverted. This is used as an input to the AND function along with DG(2) in order to permit a transition at DG(2) to pass to the input of FF5P only if either a new transition is occurring at DG(1) or if there is no transition at DG(3). Finally, DG(3) is input to AND gate 11P along with DG(2) inverted. TRNS is driven high, signifying a transition that has traversed through the filter, only when a transition reaches FF5P and is not preceded by another transition held in FF8P.

Figure 3:
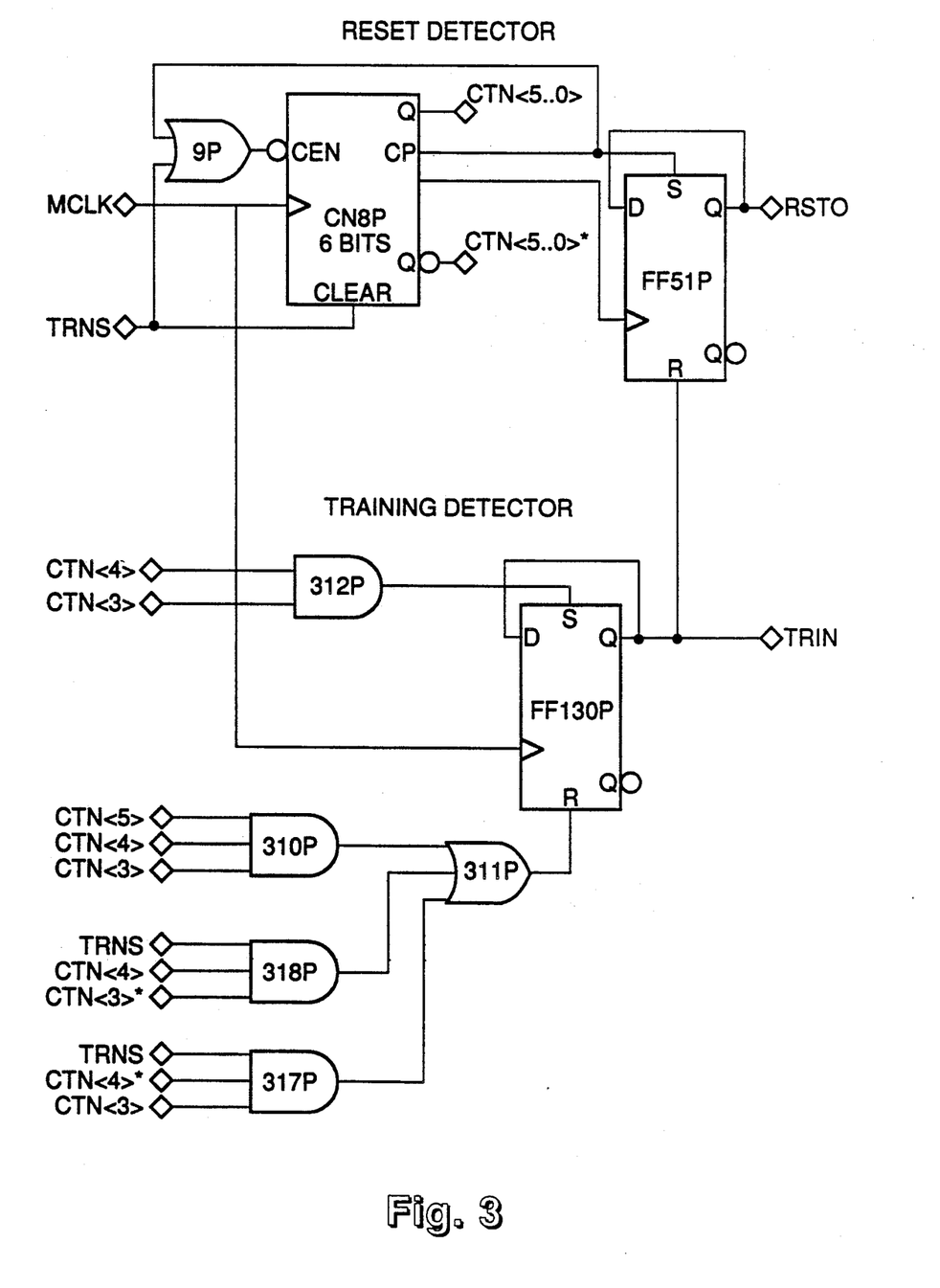
FIG. 3 shows the sequence-detector components used to recognize training and reset sequences.

Shown in FIG. 3 is the sequence detector 20 which comprises reset and training detectors for detecting reset and training sequences, respectively. A reset sequence is detected when 63 successive samples are taken without detecting a transition and is signified by the assertion of RSTO. Counter CN8P is a six-bit counter driven by MCLK. The binary outputs of counter CN8P are denoted by CTN(5) through CTN(0), going from most significant to least significant. The CEN (clock enable) input of counter CN8P is fed into by TRNS and the CP (carry propagate) output NORed together by NOR gate 9P. The CP output goes high for one MCLK cycle when the counter is full (i.e., contains all logic ones). Thus, counter CN8P is enabled only when it is not full and no transitions are received. TRNS also feeds into the clear input of counter CN8P so that when a transition is detected, signified by TRNS going high, the counter is cleared. When counter CN8P reaches a value of 63 (binary 111111), the CP output pulses the S (set) input of flip-flop FF51P. RSTO, the Q output of FF51, is then sealed high for all MCLK cycles thereafter by feeding the output back to the D input until the R (reset) input is pulsed.

TRIN is the Q output of flip-flop FF130P and signifies when high that a training sequence has been detected. A training sequence according to this particular embodiment is an input signal having 32 sample wide pulses. A training sequence will be detected, and TRIN asserted, when 24 samples are taken without detecting a transition. This condition occurs when CTN(4) and CTN(3) initially go high (i.e., when counter CN8P reaches a value of binary 011000, or twenty-four). CTN(4) and CTN(3) are ANDed together through AND gate 12P and fed to the S (set) input of FF130P to cause TRIN to go high. When TRIN is asserted, FF51P is reset to de-assert RSTO. TRIN then remains asserted until FF130P is reset by a high output from OR gate 11P. Feeding into OR gate 11P are the outputs of AND gates 10P, 18P and 17P. CTN(5), CTN(4) and CTN(3) are ANDed together through AND gate 10P. TRNS, CTN(4) and CTN(3)* are ANDed together through AND gate 18P. TRNS, CTN(4)* and CTN(3) are ANDed together through AND gate 17P. Thus, TRIN is de-asserted (i.e., a training sequence no longer detected) whenever a transition is detected in the region from 8 to 16 samples since the last detected transition or when 56 samples are taken without detecting a transition. As will be described more fully below, the assertion of TRIN results in a modification in the operation of the phase adjuster portion of the apparatus.

Figure 4:
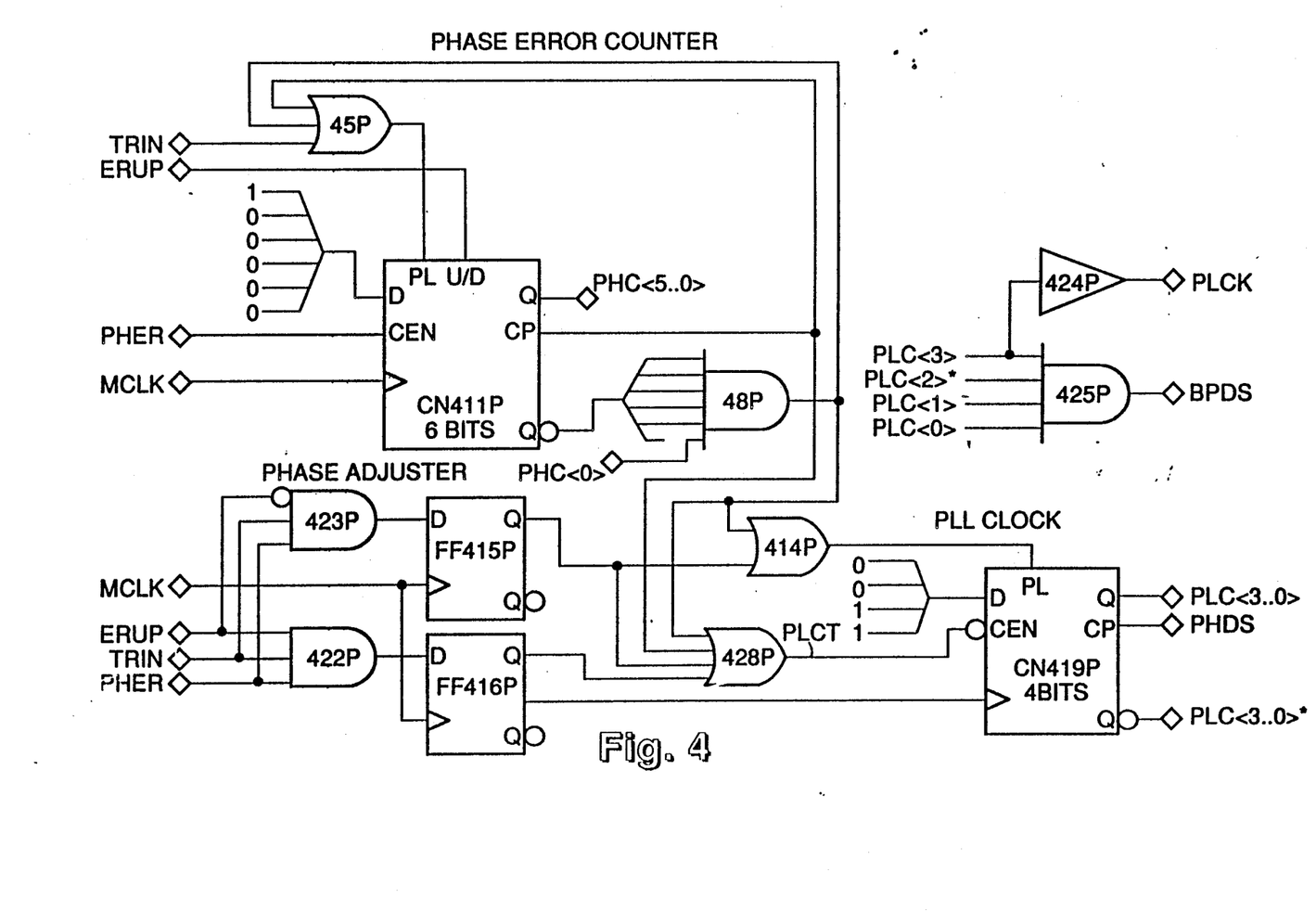
FIG. 4 shows the components of the digital phase-locked loop, the phase adjuster and the phase-error counter.

Referring next to FIG. 4, there is shown the digital PLL portion of the apparatus which generates PLCK. PLCK is a clock signal chosen to operate at the same frequency as the transmitted clock. PLCK is used to decode the input signal BPI as well as being output by the apparatus for use by external circuitry to clock in the decoded data signal SDO. PLCK is generated by four-bit counter CN419P which is driven by MCLK. PLCK is the most significant bit output of counter CN419P which rises and falls at the same frequency as the carrier input since MCLK runs 16 times faster than the transmitted clock. The operation of the phase error counter 31 and phase adjuster 32, which are used to maintain a known and constant phase relationship between PLCK and the carrier input, will be explained below after a detailed description of the transition decoder 40.

Still referring to FIG. 4, the CP (carry propagate) output from counter CN419P is denoted as phase decision signal PHDS. PHDS is pulsed high for one MCLK cycle when the value contained in counter CN419P reaches binary 1111, or fifteen. During that portion of the PLCK cycle when PHDS is asserted, the phase relationship between PLCK and the carrier input is tested by the transition decoder 40. The four Q outputs of CN419 are also fed into AND gate 425P with the next to least significant bit inverted. Thus, the output of AND gate 425P, denoted BPDS for biphase decision, goes high for one MCLK cycle when counter CN419 reaches binary 1011, or eleven. During that portion of the PLCK cycle when BPDS is asserted, a decoding decision for the data contained within the samples of BPI taken thus far is made by the transition decoder 40.

Referring now to FIGS. 5a through 5h the components of transition decoder 40 are shown. Shift register SR550P is the 17-bit sample register for storing the last 17 samples of the input signal BPI. TRNS is successively clocked into register SR550P by MCLK. The 17 outputs, denoted as TS(20) through TS(4), represent the past values of TRNS with TS(4) being the one received earliest.

Figures 5A, 5B, 5C, 5D:
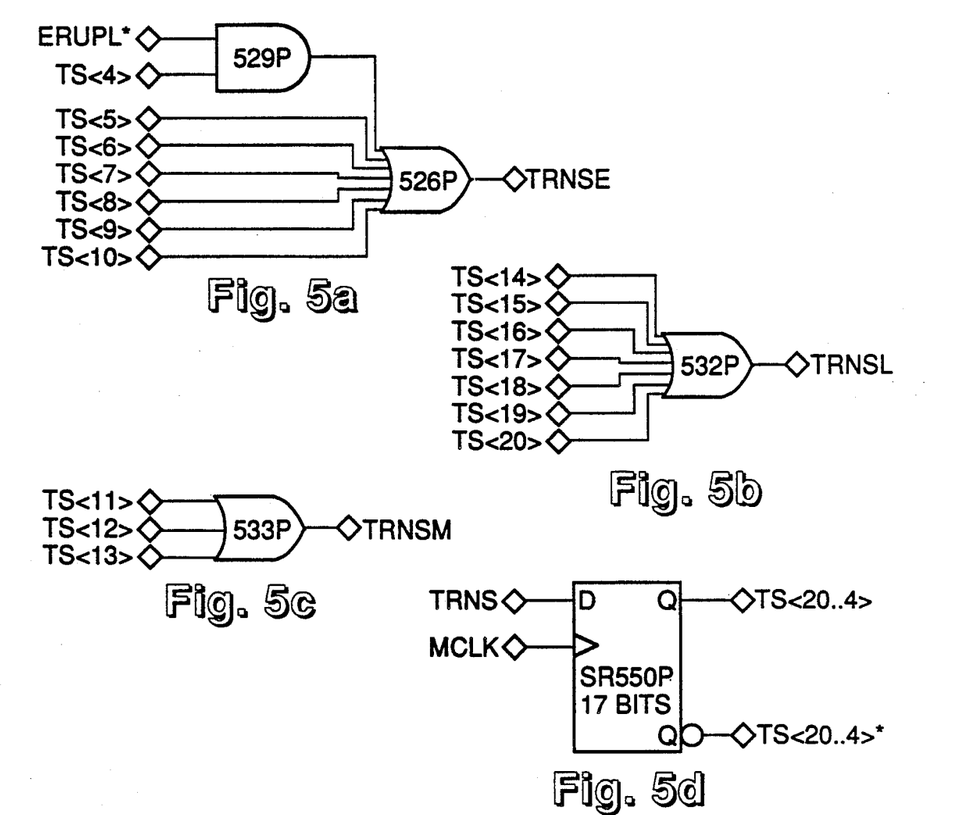
FIG. 5a shows the early-transition (before ¾time) detector components of the transition decoder.
FIG. 5b shows the late-transition (after ¾time) detector components of the transition decoder.
FIG. 5c shows the middle-transition (at ¾time) detector components of the transition decoder.
FIG. 5d shows the sample register of the transition decoder.

As aforesaid, during the time BPDS is asserted, a data decoding decision is made for the samples of BPI stored in sample register SR550P. When BPDS is asserted, flip-flop FF548P is enabled allowing MCLK to clock in the output of OR gate 545P. The Q output of FF548P is the decoded data output signal SDO. In making the decoding decision, three signals are used: TRNSE, signifying an early mid-bit transition which occurs before the ¾-bit time; TRNSM, signifying a middle mid-bit transition which occurs at the ¾-bit time plus or minus 1/16 of a bit cycle; and TRNSL, signifying a late mid-bit transition which occurs after the ¾-bit time. These signals are tested when BPDS is asserted, which occurs when the value of the PLCK counter CN419P reaches a value of eleven. At this point in the PLCK cycle, assuming the correct phase relationship between PLCK and the input carrier is maintained, TS(4) represents a sample of the input taken at 4/16-bit time, T(5) at 5/16-bit time, T(6) at 6/16-bit time, and so on. The Boolean equations which define TRNSE, TRNSM and TRNSL are as follows:

TRNSE = F-MOD + TS(5) + TS(6) + TS(7) + TS(8) + TS(9) + TS(10)

TRNSM = TS(11) + TS(12) + TS(13)

TRNSL = TS(14) + TS(15) + TS(16) + TS(17) + TS(-18) + TS(19) + TS(20)

The equations defining TRNSM and TRNSL are implemented with OR gates 533P and 532P, respectively. The equation defining TRNSE is implemented with OR gate 528P. The signal FMOD is produced by ANDing together TS(4) and ERUP* through AND gate 529P.

FMOD = TS(4) & ERUP*

Figure 5E:
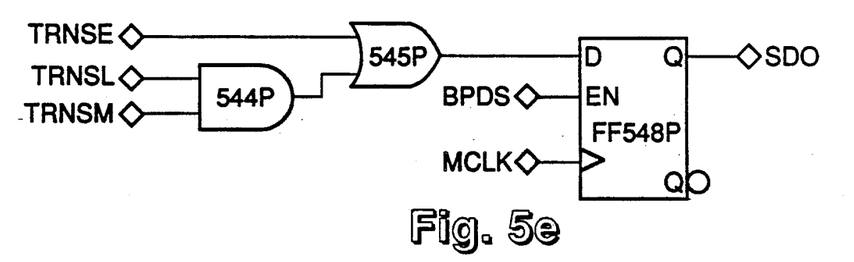
FIG. 5e shows the recovered data components of the transition decoder.
Figure 5F:
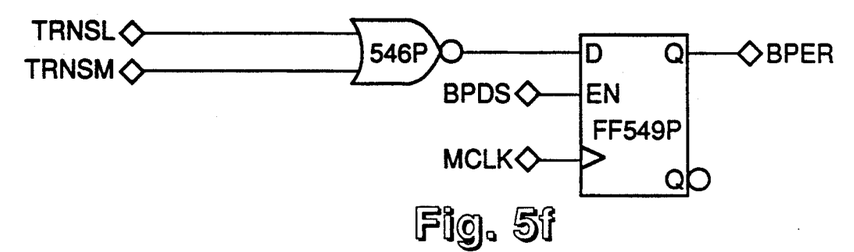
FIG. 5f shows the biphase-error detector components of the transition decoder.
Figure 5G:
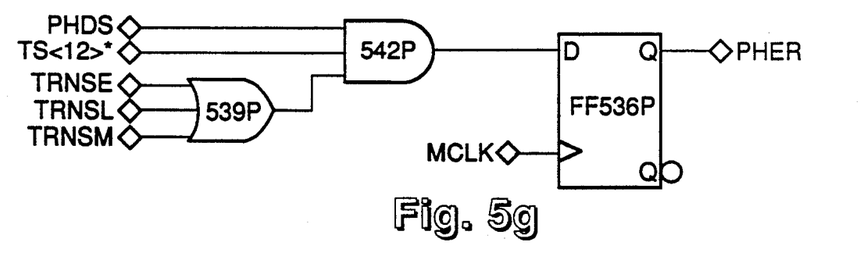
FIG. 5g shows the phase-error detector components of the transition decoder.
Figure 5H:
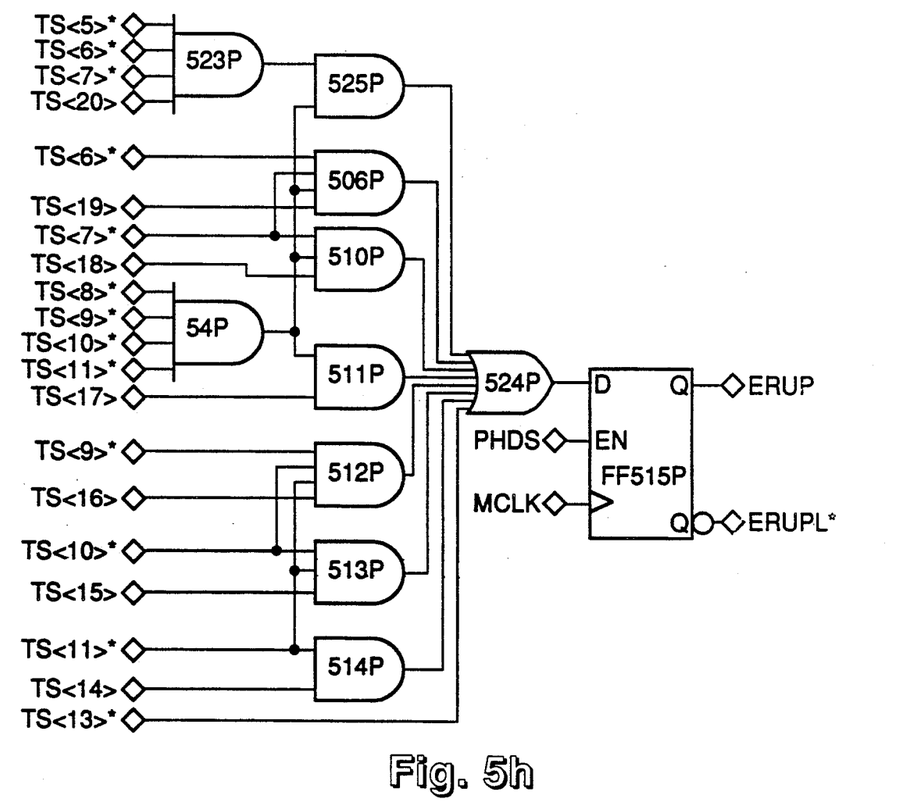
FIG. 5h shows the phase-error direction components which include a phase-error direction register of the transition decoder.

If TS(4) is a logic one during the data decoding decision, it counts as an early transition for data decoding purposes only if ERUP* is also a one (i.e., ERUP is zero). As will be explained later, the value of ERUP is set during another part of the PLCK cycle when PHDS is asserted. This occurs four MCLK cycles later when counter CN419P contains a value of 15. At this time, a transition at exactly the bit boundary of the stored samples as calculated from PLCK is represented by a one in TS(12) while a one in TS(16) indicates the transition occurred instead four MCLK cycles later at the 5/4-bit time. As is detailed below, the latter occurrence results in the assertion of the phase error signal PHER. The direction of that phase error is signified by the assertion of ERUP indicating a positive phase error. When the data decoding decision for the input bit cycle beginning with that boundary decision occurs 12 MCLK cycles later, the one signifying the bit-boundary transition will have been shifted into TS(4). In order to correctly decode the bit cycle, the one in TS(4) should not be regarded as an early mid-bit transition occurring at ¼-bit time but instead as a late bit-boundary transition occurring at 5/4-bit time of the previous input bit cycle. That will occur since FMOD is asserted when the decoding decision is made due to the earlier assertion of ERUP which causes the transition stored in TS(4) to be ignored for data decoding purposes.

The actual data decoding decision during the assertion of BPDS is made according to the following equation:

SDO = TRNSE + (TRNSM & TRNSL)

An early mid-bit transition occurring before ¾-bit time, signified by the assertion of TRNSE, will always be decoded as a data one. A mid-bit transition occurring within one sample of the ¾-bit time, signified by the assertion of TRNSM, will be decoded as a data one only if TRNSL is also asserted which is taken to represent a bit-boundary transition occurring before the 5/4-bit time of that bit cycle. Otherwise, the asserted TRNSM is taken to represent an early bit-boundary transition of the next bit cycle. That is the "look ahead" feature of the present invention. An asserted TRNSL without TRNSM also being asserted will, of course, be decoded as a data zero since TRNSL represents the bit-boundary transition. That result is accomplished by clocking the output of OR gate 545P into flip-flop FF548P with the inputs to OR gate 545P being TRNSE and TRNSL ANDed with TRNSM through AND gate 544P. The output of OR gate 545P is only clocked into FF548P by MCLK when enabled by the assertion of BPDS. The Q output of FF548P, denoted as SDO, is the decoded data output of the apparatus.

A biphase error is detected, signified by the assertion of BPER, whenever neither TRNSL nor TRNSM is asserted during the BPDS pulse. That means that neither a mid-bit transition close to ¾-bit time nor a bit-boundary transition before 5/4-bit time has occurred. TRNSL and TRNSM are ORed together through OR gate 546P which is clocked into flip-flop FF549P when enabled by BPDS. BPER is the Q output of FF549P.

The operation of the apparatus in maintaining a known and constant relationship between the input carrier and PLCK will now be described with reference to FIGS. 4 and 5a through 5h. The decision as to whether a phase error exists is made during the assertion of the PHDS pulse which occurs at that point during the PLCK cycle when counter CN419P contains a value of 15. The phase-error signal, PHER, is the Q output of flip-flop FF536P into which is clocked the output of AND gate 542P. The inputs of AND gate 542P are PHDS, TS(12)* and the output of OR gate 539 through which is ORed TRNSE, TRNSL AND TRNSM. The Boolean equation defining PHER is:

PHER = PHDS & TS(12)* & (TRNSE + TRNSM + TRNSL)

If PHER is asserted, it occurs as a pulse one MCLK cycle after the PHDS pulse. At the time of the PHDS pulse, if the correct phase relationship between samples of the input carrier in SR550P and PLCK exists, a bit-boundary transition will be found in TS(12). No phase error will be detected unless TS(12) is low, indicating no transition at that time. A phase error will then be indicated if a one, representing a transition, is found in any other location of the shift register SR550P, except for TS(4) if ERUP* is also asserted (i.e., either TRNSE, TRNSM or TRNSL is asserted). Since PHDS occurs ¼ of a bit cycle after BPDS, the terms TRNSE, TRNSM and TRNSL refer to transitions occurring at bit times of ½ to 14/16, 15/16 to 17/16, and 18/16 to 3.2, respectively. No phase error is detected if no transitions have been detected within the bit cycle.

The direction of a detected phase error is indicated by the signal ERUP which is defined by the following Boolean equation:

ERUP = TS(13) + (TS(14) & TS(11)*) + (TS(15) & TS(11)* & TS(10)*) + (TS(16) & TS(11)* & TS(10)* & TS(9)*) + (TS(17) & TS(11)* & TS(10)* & TS(9)* & TS(8)*) + (TS(18) & TS(11)* & TS(10)* & TS(9)* & TS(8)* & TS(7)*) + (TS(19) & TS(11)* & TS(10)* & TS(9)* & TS(8)* & TS(7)* & TS(6)*) + (TS(20) & TS(11)* & TS(10)* & TS(9)* & TS(8)* & TS(7)* & TS(6)* & TS(5)*)

The phase-error direction is based on whether the nearest detected transition occurs before or after the TS(12) expected bit-boundary transition. If the nearest transition occurs after the time represented by TS(12), ERUP is asserted indicating a positive phase error and that the PLL lock CN419P should be advanced in order to reach the correct phase relationship if PHER is also asserted. If the nearest transition occurs before the time represented by T(12), the PLL clock CN419P should be retarded to reach the correct phase relationship if PHER is also asserted. The logic defining ERUP is implemented with AND gates 523P, 54P, 525P, 508P, 510P, 511P, 512P, 513P and 514P along with OR gate 524P. ERUP is clocked into flip-flop FF515P when enabled by the PHDS pulse.

The manner in which the actual phase adjustments to PLCK are made will be described with reference to FIG. 4. During normal decoding operations (i.e., when TRIN is not asserted), assertion of the PHER pulse enables six-bit counter CN411P as shown in FIG. 4. MCLK pulses then cause the counter to count up or down depending on the state of ERUP which feeds into the port labeled U/D. Therefore, successive phase-error pulses change the state of counter CN411P only if they represent phase errors in the same direction as indicated by the state of ERUP.

As will be explained below, counter CN411P outputs pulses which cause PLL clock CN419P to either be advanced or retarded. A clock-advance pulse is output when counter DN411P contains a value of binary 00001, which causes the output of AND gate 48P to go high. A clock-retard pulse, on the other hand, is output from the CP (carry propagate) port of SN411P when the counter contains a value of binary 111111 (sixty-three). The clock-advance and clock-retard outputs from CN4119 are pulses which last only on MCLK cycle because both are fed back to the PL (parallel load) port of CN411P through OR gate 45P which causes binary 100000 to be loaded through the D port into the counter, changing the state of either the output from the CP port or AND gate 48P. Counter CN411P is also driven to the binary 100000 state via the parallel load operation when TRIN is asserted. Therefore, the counter is initialized with the binary 100000 value either after a phase adjustment to the PLL clock is made or after a training sequence ends. Thirty-one phase errors in one net direction or the other must then be counted by CN411P before another phase adjustment to the PLL clock can occur.

Phase adjustments to the PLL clock CN419P are made either by pulsing the PL (parallel load) port or the CEN (clock enable) port as shown in FIG. 4. The clock-retard pulse from the CP port of counter CN411P is fed through NOR gate 428P which is then inverted to disable the PLL clock for one MCLK cycle through the CEN port. Thus, the PLL clock is made to skip one MCLK cycle before resuming operation which causes the PLCK waveform to be retarded by one sample time. The clock-advance pulse, on the other hand, feeds through OR gate 414P to the PL port of the PLL clock CN419P causing binary 0011 to be loaded into the counter. Phase adjustments are initiated by the apparatus when PHER is asserted which occurs when the PLL clock CN419P contains a value of 1111 (fifteen). A clock-advance or clock-retard pulse resulting from the PHER pulse will not be clocked into the PLL clock CN419P until two MCLK cycles later since the counter CN411P takes one MCLK cycle to change state. Therefore, the PLL clock will have been advanced two MCLK cycles from binary 1111 (fifteen) to binary 0001 (one) when the actual phase-adjustment pulse arrives. On the next MCLK pulse, the PLL clock will be driven to binary 0010 (two) if no phase adjustments are made. As aforesaid, a clock-retard pulse emanating from OR gate 428P would cause the PLL clock to skip a cycle at this time. A clock-advance pulse applied to the PL port, on the other hand, causes to the PL1 clock to be advanced to binary 0011 rather than 0010 on the next MCLK cycle, which advances the PLCK waveform by one sample time.

The phase-adjustment operation described above allows the phase of PLCK to be adjusted at the most by one sample time (i.e., one MCLK cycle or 1/16 of a bit) every thirty-two PLCK cycles. In order to bring the PLL clock more quickly into phase, when input data is not being decoded, provision is made for recognizing a training sequence input which, as aforesaid, is a waveform in phase with the input carrier but at ¼ the frequency. When the training sequence is recognized, TRIN is asserted which causes phase-error pulses PHER to be clocked either into flip-flop FF415P through AND gate 423P or into flip-flop FF416P through AND gate 4229, depending on the state of the phase error indicator ERUP which also feeds into the AND gates. The PHER pulses which are clocked into FF416P cause the PLL clock to be advanced as the Q output of FF415P is fed into OR gate 414P while PHER pulses clocked into FF416P retard the PLL clock since the F416P's Q output is fed into OR gate 428P. The clock-advance and clock-retard operations are the same as described above with respect to the phase-error counter CN411P and occur at the same point in the PLCK cycle since the PHER pulse is delayed by the one MCLK cycle needed to clock it through either FF415P or FF416P. A phase-error pulse PHER occurring when TRIN is asserted causes an immediate 1/16-bit phase adjustment to PLCK waveform. Of course, PHER pulses are only asserted when transitions are detected, which only occur twice during each cycle of the training sequence input. This means that during the time a training sequence is being received, 1/16-bit phase adjustments may be made to the PLL clock every 32 MCLK cycles.

Thus, the apparatus as described produces a clock signal PLCK and a recovered data output signal SDO. PLCK can be used by external circuitry to clock in the data values represented by the SDO output.

Although the invention has been described in conjunction with the foregoing specific embodiment, many alternatives, variations and modifications will be apparent to those of ordinary skill in the art. Those alternatives, variations and modifications are intended to fall within the spirit and scope of the appended claims.

What is claimed is:

1. A method for decoding digitally-encoded transmission signals where transitions within the transmission signal represent a combination of transmitted clock and data signals, the frequency of the transmitted clock signal is known, successive transitions over a period of time equal to one transmitted clock or bit cycle represent one transmitted clock cycle and a transmitted data signal of one polarity, and successive transitions over one bit cycle with an additional transition occurring midway through the bit cycle represent a transmitted clock cycle and a transmitted data signal of the opposite polarity, comprising the steps of:

sampling the transmission signal at a rate equal to some multiple of the transmitted clock frequency;

detecting whether or not a transition of the transmission signal occurred within said sample and successively storing with respect to time binary representations of whether or not a transition occurred within said sample;

generating a clock signal with a digital phase-locked loop which can be either advanced or retarded in phase in response to a phase-error signal and a phase-error direction indicator;

maintaining a known and constant phase relationship between the phase-locked loop clock and the received clock of the transmission signal by periodically testing the stored transition representations and generating a phase-error signal and direction indicator when a phase error between the phase-locked loop clock and the received clock signal exists and then using the phase-error signal and direction indicator to advance or retard the phase-locked loop clock accordingly; and using the phase-locked loop clock to decode a stored transition representation as the most probable of either the start of a new bit cycle or a mid-bit transition according to the known length of the input bit cycle, wherein a transition occurring before a time interval containing the ¾-bit time as measured by the phase-locked loop clock is decoded as a mid-bit transition while a transition occurring after a time interval containing the ¾-bit time is decoded as the start of a new bit cycle.

2. The method as set forth in claim 1 comprising the additional step of producing a data output signal in accordance with the decoded transition representations, thereby demodulating the transmission signal input.

3. The method as set forth in claim 1 wherein a transition representation representing a transition which occurred within an interval containing the ¾-bit time is decoded as a mid-bit transition if another stored transition representation indicates a later transition occurred before the 5/4-bit time and decoded as the start of a new bit cycle otherwise.

4. An apparatus for decoding digitally-encoded transmission signals where transitions within the transmission signal represent a combination of transmitted clock and data signals, the frequency of the transmitted clock signal is known, successive transitions over a period of time equal to one transmitted clock or bit cycle represent one transmitted clock cycle and a transmitted data signal of one polarity, and successive transitions over one bit cycle with an additional transition occurring midway through the bit cycle represent a transmitted clock cycle and a transmitted data signal of the opposite polarity, comprising:

means for sampling the transmission signal at a rate equal to some multiple of the transmitted clock frequency;

means for detecting whether or not a transition of the transmission signal occurred within said sample and successively storing binary representations of whether or not a transition occurred within said sample in a shift register;

means for generating a clock signal with a digital phase-locked loop which can be either advanced or retarded in phase in response to a phase-error signal and a phase-error direction indicator;

means for ascertaining whether a known and constant phase relationship between the phase-locked loop clock and the received clock of the transmission signal exists by periodically testing the transition representations stored in said shift register and generating a phase-error signal and direction indicator when a phase error between the phase-locked loop clock and the received clock signals is present;

means for advancing or retarding the phase-locked loop clock according to the phase-error signal and direction indicator to maintain a known and constant phase relationship between the phase-locked loop clock and the received clock; and means for using the phase-locked loop clock to decode a transition representation stored in said shift register as the most probable of either the start of a new bit cycle or a mid-bit transition according to the known length of the input bit cycle wherein a transition occurring before a time interval containing the ¾-bit time as measured by the phase-locked loop clock is decoded as a mid-bit transition while a transition occurring after a time interval containing the ¾-bit time is decoded as the start of a new bit cycle.

5. A method for decoding digitally-encoded transmission signals where transitions within the transmission signal represent a combination of transmitted clock and data signals, the frequency of the transmitted clock signal is known, a zero during the first half of the bit cycle with a one during the second half of the bit cycle represents a data signal of one polarity, and a one during the first half of the bit cycle with a zero during the second half represents a data signal of the opposite polarity, comprising the steps of:

sampling the transmission signal at a rate equal to some multiple of the transmitted clock frequency;

detecting whether or not a transition of the transmission signal occurred within said sample and successively storing with respect to time binary representations of whether or not a transition occurred;

generating a clock signal with a digital phase-locked loop which can be either advanced or retarded in phase in response to a phase-error signal and a phase-error direction indicator;

maintaining a known and constant phase relationship between the phase-locked loop clock and the received clock of the transmission signal by periodically testing the stored transition representations and generating a phase-error signal and direction indicator when a phase error between the phase-locked loop clock and the received clock signals exist and then using the phase-error signal and direction indicator to advance or retard the phase-locked loop clock accordingly; and using the phase-locked loop clock to decode a stored transition representation as the most probable of either the start of a new bit cycle or a mid-bit transition according to the known length of the input bit cycle wherein a transition occurring before a time interval containing the ¾-bit time as measured by the phase locked loop clock is decoded as a mid-bit transition while a transition occurring after a time interval containing the ¾-bit time is decoded as the start of a new bit cycle.

6. The method as set forth in claim 5 comprising the additional step of producing a data output signal in accordance with the decoded transition representations, thereby demodulating the transmission signal input.

7. The method as set forth in claim 5 wherein a transition representation representing a transition which occurred within an interval containing the ¾-bit time is decoded as a mid-bit transition if another stored transition representation indicates a later transition occurred before the 5/4-bit time and decoded as the start of a new bit cycle otherwise.

8. An apparatus for decoding digitally-encoded transmission signals where transitions within the transmission signal represent a combination of transmitted clock and data signals, the frequency of the transmitted clock signal is known, a zero during the first half of the bit cycle with a one during the second half of the bit cycle represents a data signal of one polarity, and a one during the first half of the bit cycle with a zero during the second half represents a data signal of the opposite polarity, comprising:

means for sampling the transmission signal at a rate equal to some multiple of the transmitted clock frequency;

means for detecting whether or not a transition of the transmission signal occurred within said sample and successively storing binary representations of whether or not a transition occurred within said sample in a shift register;

means for generating a clock signal with a digital phase-locked loop which can be either advanced or retarded in phase in response to a phase-error signal and a phase-error direction indicator;

means for ascertaining whether a known and constant phase relationship between the phase-locked loop clock and the received clock of the transmission signal exists by periodically testing the transmission representations stored in said shift register and generating a phase-error signal and direction indicator when a phase error between the phase-locked loop clock and the received clock signals is present;

means for advancing or retarding the phase-locked loop clock according to the phase-error signal and direction indicator to maintain a known and constant phase relationship between the phase-locked loop clock and the received clock; and means for using the phase-locked loop clock to decode a transition representation stored in said shift register as the most probable of either the start of a new bit cycle or a mid-bit transition according to the known length of the input bit cycle wherein a transition occurring before a time interval containing the ¾-bit time as measured by the phase-locked loop clock is decoded as a mid-bit transition while a transition occurring after a time interval containing the ¾-bit time is decoded as the start of a new bit cycle.

9. The apparatus as set forth in claim 4 additionally comprising means for producing a data output signal in accordance with the decoded transition representations, thereby demodulating the transmission signal input.

10. The apparatus as set forth in claim 4 additionally comprising means for decoding a transition representation representing a transition which occurred within an interval containing the ¾-bit time is decoded as a mid-bit transition if another transition representation stored within said shift register indicates a later transition occurred before the 5/4-bit time and decoded as the start of a new bit cycle otherwise.

11. The apparatus as set forth in claim 8 additionally comprising means for producing a data output signal in accordance with the decoded transition representations, thereby demodulating the transmission signal input.

12. The apparatus as set forth in claim 8 additionally comprising means for decoding a transition representation representing a transition which occurred within an interval containing the ¾-bit time is decoded as a mid-bit transition if another transition representation stored within said shift register indicates a later transition occurred before the 5/4-bit time and decoded as the start of a new bit cycle otherwise.

* * * * *